April 27, 1943.                M. H. GRAHAM                    2,317,453
                        BEVERAGE MAKING APPARATUS
                          Filed Nov. 6, 1939              2 Sheets—Sheet 1

INVENTOR
MAURICE H. GRAHAM
BY *Paul, Paul Moore Geire*
ATTORNEYS

April 27, 1943.  M. H. GRAHAM  2,317,453
BEVERAGE MAKING APPARATUS
Filed Nov. 6, 1939  2 Sheets-Sheet 2
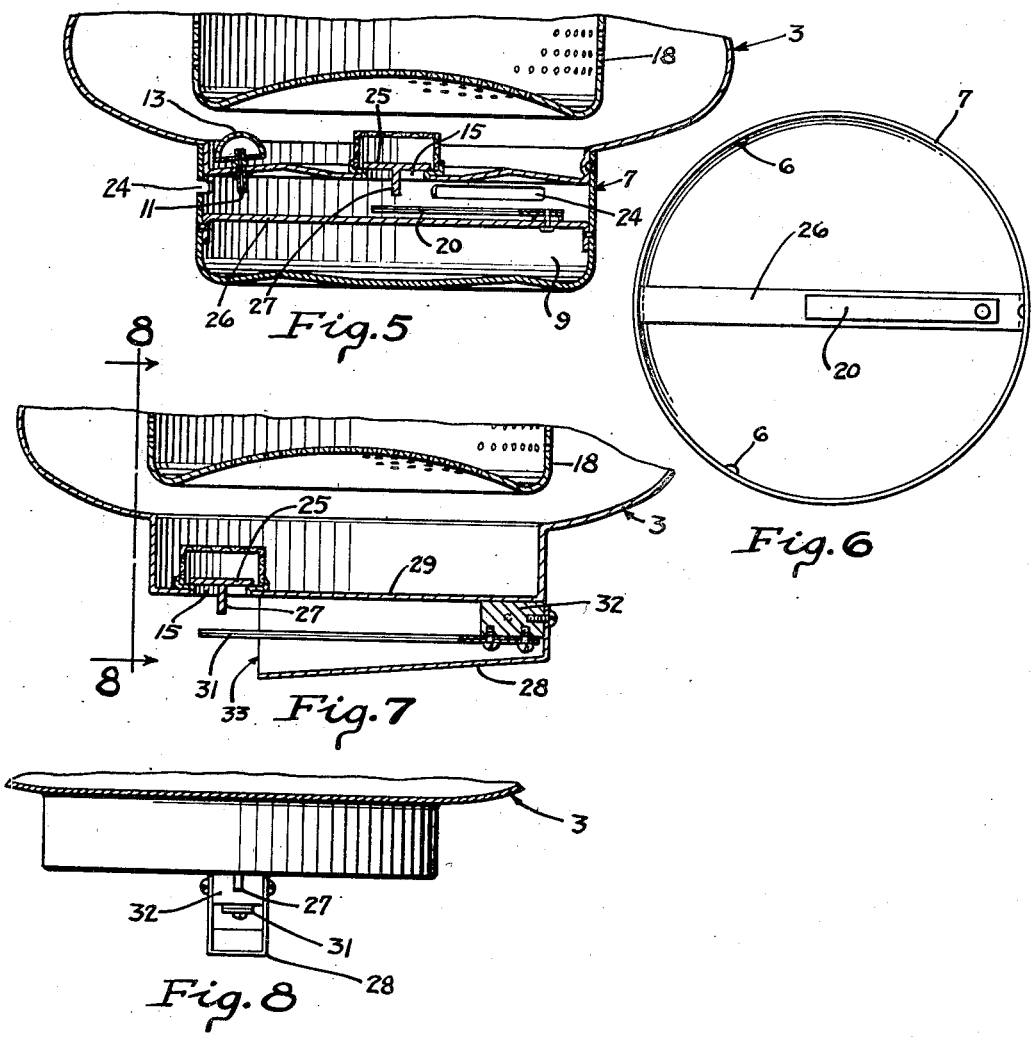
INVENTOR
MAURICE H. GRAHAM
BY
ATTORNEYS Patented Apr. 27, 1943

2,317,453

UNITED STATES PATENT OFFICE 2,317,453

BEVERAGE MAKING APPARATUS

Maurice H. Graham, Minneapolis, Minn.

Application November 6, 1939, Serial No. 303,070

8 Claims. (Cl. 53—3)

This invention relates to new and useful improvements in liquid infusion or beverage making apparatus, and more particularly to such an apparatus adapted for making tea.

In the making or brewing of tea, the steeping period plays an important part in the quality of the brewed tea. If the steeping period is prolonged beyond a predetermined time, the tannic acid inherent in the tea leaves may be released in the infusion, and may greatly affect its flavor. If the steeping period is shortened too much, the team may also be lacking in flavor, and such shortening of the steeping period may also result in wastefulness.

An object of the present invention therefore is to provide a tea maker comprising means for positively controlling the steeping period, whereby when the correct measured quantities of tea leaves and boiling water are used, each infusion will always have the same flavor, and the danger of over-steeping is entirely eliminated.

A further object is to provide a beverage maker of the type wherein the beverage is steeped in a container and after a predetermined time, is discharged therefrom through a valve-controlled opening into a suitable receptacle.

A further object is to provide an apparatus for brewing tea or other beverages, having means for automatically controlling the steeping period, and which does not require the constant care of an attendant, thereby greatly simplifying the operation of making high quality tea.

A further object is to provide a tea maker comprising a lower receptacle which may be in the form of a tea pot, and a container adapted to be supported thereon having a valve controlled opening in its bottom wall, and means being provided within the container for receiving tea leaves or other material to be steeped in the boiling water contained in the container, said container having a chamber therebeneath which is in communication with the container through a restricted metering orifice, whereby liquid from the container may slowly drain into the chamber and thereby eventually actuate a float supported in the chamber and cause the float to open the valve normally closing said discharge opening, whereby the liquid infusion or tea may quickly drain from the container into the tea pot, after a predetermined time.

Other objects reside in the novel means provided for automatically opening the valve which normally closes the discharge opening in the container, after a predetermined time; in the provision of a chamber beneath the container, having a float therein adapted to engage and unseat the valve, after a predetermined time; in the provision of a chamber which is in constant communication with the container, whereby when boiling water or liquid is introduced into the container, a portion of the liquid will slowly drain into the chamber and gradually fill it to a predetermined level, whereby a valve-actuating member supported in the chamber is operated to engage and open the valve and permit the liquid infusion or tea in the container to drain therefrom into a receptacle; in the provision of a container having a discharge opening in its bottom wall normally closed by a suitable valve, and a thermostatic element adapted subsequently to be actuated by the temperature of the liquid draining into the chamber, whereby said element will engage and open the valve and permit the tea to quickly drain from the container into a suitable receptacle, after a predetermined time; and, in the simple and inexpensive construction of the apparatus and the arrangement of the parts thereof, whereby the apparatus may be manufactured at small cost and whereby it readily lends itself for cleaning, which is essential in apparatus of this general character.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 5 is a detail sectional view of the lower portion of a container, showing a valve operating member of different construction;

Figure 6 is a plan view of the housing shown in Figure 5, removed from the container;

Figure 7 is a view showing another modification; and

Figure 8 is a detail sectional view substantially on the line 8—8 of Figure 7.

Figure 1:
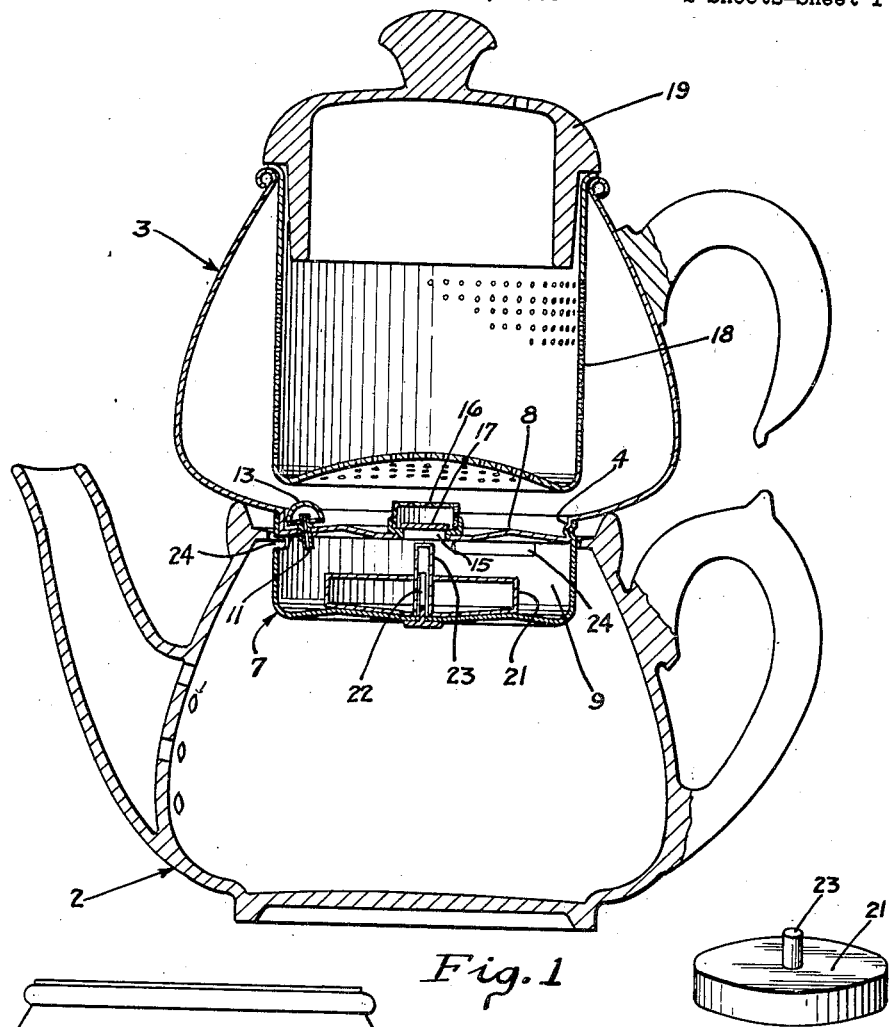
Figure 1 is a cross-sectional view showing the invention in its preferred form.

In the selected embodiment of the invention here shown, there is illustrated in Figure 1, for purposes of disclosure, a tea pot, generally designated by the numeral 2, which may be of more or less conventional design. A suitable container 3 is shown supported on the tea pot or receptacle 2, and has a depending portion 4 provided with a plurality of bayonet slots 5 adapted to receive projections 6 provided upon the upper marginal edge of a suitable housing 7. The housing 7 is detachably supported on the bottom of the container 3 by the bayonet slots 5 and projections 6, and cooperates with the bottom wall 8 of the container to define a chamber 9.

Figure 3:
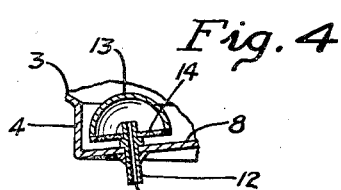
Figure 3 is an enlarged detail sectional view showing the restricted orifice or passage through which a portion of the liquid in the container drains into the chamber.

The chamber 9 is in constant communication with the interior of the container 3 through a restricted passage 11, shown formed by a small tubular member 12, suitably secured to the bottom wall 8 of the container, as shown in Figure 3. To prevent clogging of the passage 11, the upper end thereof within the container 3 is provided with a suitable hood 13, which preferably is imperforate. A suitable screen 14 is secured to the lower marginal edge of the hood 13 and to the upper end portion of the tubular member 12. The screen or member 14, as best shown in Figure 3, is spaced from the bottom wall 8 of the container to provide a gap or circulating space for the brewed tea or liquid in the container 3 to enter the hood 13 and pass through the restricted passage 11 into the chamber 9.

The container 3 has a discharge opening 15 having a suitable screen 16 positioned thereover, as best shown in Figure 1. A suitable valve such, for example, as a disk valve 17, normally closes the discharge opening 15. The screen 16, in addition to providing means for filtering or straining the liquid discharging from the container into the chamber 9, also serves as a valve cage for the valve 17, as will readily be understood by reference to Figure 1.

A perforated member or basket, generally designated by the numeral 18, is removably supported within the container 3. The basket 18 is adapted to receive the infusion material, such as tea leaves or other material to be steeped in the container 3. A suitable closure or cover 19 provides means for closing the upper end of the container 3 and basket 18.

Means is provided for opening the valve 17 after a predetermined time, whereby the liquid infusion or beverage in the container 3 may drain therefrom into the receptacle or tea pot 2. In Figure 1, the valve opening means is shown comprising a float, generally designated by the numeral 21. This float may be guidingly supported on a small stem 22 secured to the bottom wall of the housing 7. In the construction shown in Figure 1, the float 21 is provided with an upstanding post 23 which, for practical purposes, is made hollow so that its lower end may receive the stem 22, whereby the float is retained in alinement with the valve 17, as will readily be understood.

In the operation of the novel infusion or tea maker herein disclosed, a measured quantity of tea leaves or other infusion material is placed in the perforated basket 18 and a predetermined quantity of boiling water is then poured into the basket, which immediately flows into the container 3, as a result of the perforations in the wall of the basket 18.

Figure 2:
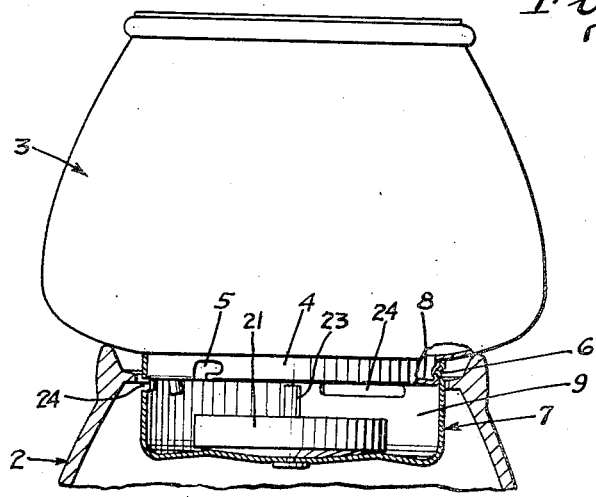
Figure 2 is a view partially in section, showing the means for attaching the housing to the bottom of the container to provide a chamber for the valve control means.

As soon as the boiling water has been introduced into the container 3, the steeping or brewing process commences. At the same instance, a portion of the water in the container 3 begins to drain into the chamber 9 through the restricted or metering passage 11. The size of this passage is such that by the time enough liquid has entered the chamber 9 to raise the float 21 to a position to engage and open the valve 17, the steeping period has been completed, whereby liquid infusion or tea in the container 3 is quickly discharged therefrom into the chamber 9, through the discharge opening 15 in the bottom wall of the container. This opening, it will be noted, is relatively large in size to expedite the operation of draining the steeped tea from the container into the chamber 9. From the chamber 9, the infusion drains into the receptacle 2 through a plurality of elongated openings 24, provided in the upper portion of the wall of the housing 7, as shown in Figures 1 and 2. One of the elongated openings 24 is so related to the projections 6 of the housing 7, that it is substantially alined with the spout of the tea pot, when the handles of the container 3 and tea pot or receptacle 2 are vertically alined, as shown in Figure 1, whereby substantially all of the liquid in the chamber 9 will drain into the receptacle 2, when the apparatus is tilted at an angle to dispense a portion of the beverage from the spout of the receptacle 2. By using a float in conjunction with the restricted passage 11, for automatically opening the valve, when a predetermined quantity of liquid has drained into the chamber 9, each liquid infusion or brew discharged from the container 3 into the receptacle 2, will have the same characteristics and flavor provided, of course, that the same quantity of tea leaves and water is used for each brew and, with the understanding, of course, that the water is at substantially boiling temperature.

Figure 4:
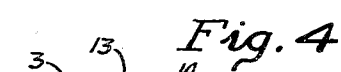
Figure 4 is a perspective view of the float removed from the chamber.

The novel beverage or tea maker herein disclosed, is extremely simple in construction and readily lends itself for domestic use. The basket 18 is readily removable from the container for cleaning purposes and, in like manner, the housing 7 is readily detachable from the bottom of the container to gain access to the interior of the chamber 9 and the float 21 and valve 15. When the housing 7 is detached from the container, the float 21 may be removed therefrom, as shown in Figure 4, to facilitate cleaning the float and the interior of the housing.

In Figures 5 and 6, there is shown a construction wherein a bi-metal element 20 is provided within the chamber 9, instead of the float 21, for opening the valve 25 provided in the discharge opening 15 of the container 3. The bi-metal element 20 may be supported on a suitable bar 26 having its terminals secured to the upright walls of the housing 7, as best shown in Figure 5. The supporting bar 26 is spaced upwardly from the bottom wall of the housing 7, as shown in Figure 5, whereby it is not actuated to open the valve until the chamber 9 has been partially filled with liquid entering therein through the restricted passage 11. As soon as the level of the liquid in the chamber 9 reaches the bi-metal element 20 or comes within a certain distance thereof, the temperature of the liquid will cause the free end of the element 20 to warp in an upward direction, whereby it will engage the depending stem 27 of the valve 25 and thereby open the valve to permit the liquid infusion in the container to drain into the chamber 9, from whence it discharges into the receptacle 2 through the elongated openings 24 in the upper wall portion thereof.

The operation of the structure illustrated in Figures 5 and 6, is very similar to that of the structure shown in Figures 1 to 4, in that the liquid draining into the chamber 9 causes the valve operating element (float 21 or element 20) to engage and open the valve after a predetermined time.

Figures 7 and 8 illustrate another form wherein the housing 7, shown in the previous figures, has been dispensed with and in lieu thereof, an elongated housing 28 is secured to the bottom wall 29 of the container 3. In Figure 7, it will be noted that the discharge opening of the container 3 is shown offset from the axis of the container in position to be engaged by the free end of a bi-metal element 31, having its opposite end suitably secured to a metallic block 32 of a suitable conductive material. The block 32, it will be noted, is in direct contact with the bottom wall 29 of the container 3, and is confined within the closed end of the housing 28. The opposite end of the housing is open, as shown at 33 to provide free flexing movement of the bi-metal element 31.

The bi-metal element 31, shown in Figures 7 and 8, is operated by conduction of heat through the bottom wall 29 of the container and block 32, and not as a result of direct contact with the hot liquid. In other words, when boiling water is poured into the container 3, the temperature of the block 32 immediately begins to rise, as a result of the block directly contacting the wall 29. The heat from the liquid is thus conducted through the block 32 to the bi-metal element 31. Such conduction of heat to the bi-metal element 31, will cause its free end to warp in an upward direction, whereby it will eventually engage and open the valve 25. If desired, a suitable adjusting screw, not shown in the drawings, may be provided for adjusting the position of the bi-metal element 31 (or 20), to vary the length of the steeping period. If the apparatus is always to be used for brewing the same kind of beverage such, for example, as tea, it is unnecessary to provide means for adjusting the operation of the bi-metal elements 20 or 31, as these elements will then be so designed as to open their respective valves after a predetermined time, the length of which will depend upon the characteristics of the infusion to be made.

I claim as my invention:

1. In an apparatus of the class described, a container wherein the beverage is steeped, said container having a valve controlled discharge opening, a cup-shaped member detachably secured to the bottom wall of the container and cooperating therewith to form a chamber, said chamber being in constant communication with the container through a restricted passage, a float in said chamber, and means on said float adapted to engage and unseat the valve, when the float is elevated to a predetermined position by the liquid entering the chamber, whereby the infusion in the container may quickly discharge therefrom.

2. In an apparatus of the class described, a container wherein the beverage is steeped, said container having a valve controlled discharge opening, a cup-shaped member secured to a wall of the container and cooperating therewith to form a chamber, said chamber being in direct communication with the container through a restricted passage, and a float in said chamber adapted to be elevated by liquid entering the chamber, thereby to subsequently engage and unseat the valve after a predetermined time, whereby the infusion in the container may quickly discharge therefrom.

3. In an apparatus for brewing tea, a container having a member therein for receiving the tea leaves, said container having a discharge opening, a valve for closing said opening, a housing having means for detachably connecting it to the bottom wall of the container exteriorly thereof and cooperating therewith to provide a chamber, said chamber being in constant communication with the container through a restricted passage, whereby a portion of the liquid may slowly drain into the chamber, and a member contained within the chamber and adapted to be actuated by the liquid draining into the chamber from the container, whereby said member will subsequently engage and open the valve to permit the brewed tea to quickly drain from the container into a suitable receiving means, after a predetermined time.

4. In an apparatus for brewing tea, a container having means therein for receiving the tea leaves, said container having a discharge opening which is normally closed by a suitable valve, a housing detachably secured to the lower wall of the container and cooperating with said wall to provide a chamber which is located exteriorly of the container, a metering orifice establishing communication between the container and chamber, and whereby a portion of the liquid in the container may slowly drain into the chamber, a receptacle upon which the container is supported, and a float in said chamber adapted to be actuated by the liquid draining into the chamber from the container, whereby the float will subsequently engage and open the valve closing the discharge opening, thereby to permit the brewed tea to quickly drain from the container into said receptacle, after a predetermined time, said float being readily removable from the chamber for cleaning, when the housing is detached from the container.

5. In an apparatus for brewing tea, a container having means therein for receiving tea leaves, said container having a discharge opening in its bottom wall, a valve normally closing said opening, means forming a chamber below said bottom wall, said chamber being in communication with the container through a restricted passage, and a temperature responsive element mounted in said chamber and adapted to be actuated by a rise in the temperature in said chamber, as a result of hot liquid draining thereinto from the container, through said restricted passage, whereby said temperature responsive element will subsequently engage and open the valve and permit the brewed tea to quickly drain from the container into a suitable receptacle, after a predetermined time.

6. In an apparatus for brewing tea, a container having means therein for receiving tea leaves, said container having a discharge opening in its bottom wall, a valve normally closing said opening, means forming a chamber below said bottom wall, said chamber being in communication with the container through a restricted passage, whereby a portion of the liquid in the container may gradually drain into the chamber, and a member mounted within the chamber and adapted to be actuated by the temperature of the liquid received in said chamber, thereby to engage and open the valve and permit the brewed tea to drain from the container into a suitable receptacle, after a predetermined time.

7. In an apparatus for brewing tea, a container adapted to receive measured quantities of boiling water and tea leaves, said container having a discharge opening on its bottom wall, a valve normally closing said opening, means forming a chamber below the container, said chamber being in communication with the container through a restricted passage, and a thermostatic element in said chamber adapted to be actuated by a rise in the temperature in said chamber, as a result of the hot liquid entering the chamber from the container, through said restricted passage, whereby said element will subsequently engage and open the valve and cause the brewed tea in the container to drain into a suitable receptacle after a predetermined time.

8. In an apparatus for brewing tea, a container having means therein for receiving tea leaves, said container having a discharge opening in its bottom wall, a valve normally closing said opening, means forming a chamber below said bottom wall, said chamber being in communication with the container through a restricted passage, whereby a portion of the hot liquid in the container may gradually drain into the chamber, and a thermostatic element horizontally mounted in the chamber in vertically spaced relation to the bottom thereof, said element being adapted to be engaged by the water rising in said chamber, whereby its free end will subsequently warp into engagement with the valve and open it, and permit the steeped tea in the container to quickly drain into a suitable receptacle.

MAURICE H. GRAHAM.